Patented Nov. 17, 1931

1,831,824

UNITED STATES PATENT OFFICE

FRITZ ROTHE AND HANS BRENEK, OF BERLIN, GERMANY, ASSIGNORS TO THE FIRM: RHENANIA-KUNHEIM VEREIN CHEMISCHER FABRIKEN AKTIENGESELLSCHAFT, OF BERLIN, GERMANY

PROCESS FOR OBTAINING BARIUM ALUMINATE

No Drawing. Application filed July 22, 1927, Serial No. 207,810, and in Germany July 30, 1926.

It has already been proposed to obtain barium aluminate by subjecting a mixture of alumina containing materials, barium sulphate and carbon to a heating, or by heating a mixture of alumina containing materials and heavy spar without any addition of carbon or other reducing agents under expulsion of the sulphuric acid of the heavy spar in the presence of steam, and a neutral or slowly oxidizing atmosphere.

According to the present invention it has been found, that on determining the quantity of heavy spar it is necessary to take into consideration such constituents, as silica and titanic acid, which in most cases are to be found in the alumina containing materials. For those constituents such additional quantities of heavy spar must be added, that barium meta-silicate or barium ortho-silicate or the corresponding titanium-compounds are formed. If such a mixture is subjected to a heating in the presence of steam, a complete decomposition of the heavy spar is obtained under expulsion of the sulphuric acid, whereas simultaneously barium aluminate is formed in addition to barium silicate or a corresponding titanium-compound.

The barium aluminate obtained can be lixiviated in a known manner from the molten material and further treated to produce alumina-, and barium-compounds, whereas the residue consisting chiefly of iron oxide and barium meta-silicate, can be used for the production of barium salts.

It is of special advantage, if the steam required for the reaction acts upon the mixture at the moment of sintering. For this purpose the steam may be introduced into the flame which serves for heating the mixture. A temperature of 1100° C. is the lowest temperature limit at which the decomposition can be accomplished in a practically perfect manner with direct heating by means of neutral or oxidizing gases in the presence of steam. Hence the temperature necessary may be properly characterized as at least 1100° C.

Working examples 1. 100 parts of a heavy spar containing 92.63% of $BaSO_4$ and 3.72% of $SiO_2$ are mixed with 56 parts of bauxite composed in the following proportion: $Al_2O_3=52.86\%$, $SiO_2=2.71\%$ and $TiO_2=2.84\%$. Said mixture corresponds to the formation of barium meta-silicate in addition to barium aluminate. The mixture is subjected to a heating at 1200° C. in the presence of steam.

58.15% of the heating product is dissolved, whereas the residue contains only 2.6% of $Al_2O_3$. This corresponds to a yield of 91%.

2. 100 parts of the same heavy spar and 40.2 parts of the same bauxite (formation of barium ortho-silicate in addition to barium aluminate) are subjected in the same manner to a heating in the presence of steam. The product obtained of the heated crude mixture renders with water a solution containing 20.81% of $Al_2O_3$ and 38.72% of $BaO$, that is to say: at a total content of 20.9% of $Al_2O_3$ in the heating product a yield of 99.5% thereof has been obtained.

What we claim and desire to secure by Letters Patent of the United States is:

1. Process for obtaining barium aluminate and barium silicate, comprising heating a mixture of materials containing heavy spar and alumina with silica impurity in the presence of steam in a non-reducing atmosphere to a temperature of at least 1100° C., said mixture containing such quantities of heavy spar, that in addition to barium aluminate silicates of the type $BaSiO_3$ to about $Ba_3SiO_5$ are formed of the silica contained in the alumina containing materials.

2. Process for obtaining barium aluminate and barium titanate, comprising heating a mixture of materials containing heavy spar and alumina with titanic acid impurity in the presence of steam in a non-reducing atmosphere to a temperature of at least 1100° C., said mixture containing such quantities of heavy spar, that in addition to barium aluminate titanium compounds of the type $BaTiO_3$ to about $Ba_3TiO_5$ are formed of the $TiO_2$ contained in the alumina containing materials.

FRITZ ROTHE.
HANS BRENEK.